(12) United States Patent
Jacobs et al.

(10) Patent No.: US 12,422,940 B2
(45) Date of Patent: *Sep. 23, 2025

(54) BASE STATION FOR USE WITH DIGITAL PENS

(71) Applicant: Microsoft Technology Licensing, LLC, Redmond, WA (US)

(72) Inventors: Joel Bernard Jacobs, Seattle, WA (US); Bryan Anthony Sparks, Sammamish, WA (US); Kae-Ling Jacquline Gurr, Seattle, WA (US); Chad Michael Roberts, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/329,064

(22) Filed: May 24, 2021

(65) Prior Publication Data
US 2021/0278913 A1  Sep. 9, 2021

Related U.S. Application Data

(63) Continuation of application No. 14/692,735, filed on Apr. 21, 2015, now Pat. No. 11,016,581.

(51) Int. Cl.
G06F 3/0354 (2013.01)
G06F 3/039 (2013.01)
G06F 13/10 (2006.01)
G06F 21/32 (2013.01)
H02J 7/00 (2006.01)
H02J 50/10 (2016.01)
H02J 50/90 (2016.01)

(52) U.S. Cl.
CPC .......... *G06F 3/03545* (2013.01); *G06F 3/039* (2013.01); *G06F 13/10* (2013.01); *G06F 21/32* (2013.01); *H02J 7/0013* (2013.01); *H02J 7/0044* (2013.01); *H02J 50/10* (2016.02); *H02J 7/00045* (2020.01); *H02J 50/90* (2016.02); *H02J 2310/22* (2020.01)

(58) Field of Classification Search
CPC ...... G06F 3/03545; G06F 13/10; G06F 21/32; G06F 3/039; H02J 7/0013; H02J 7/0027; H02J 7/0044; H02J 7/025; H02J 50/10; H02J 7/00045; H02J 50/90; H02J 2310/22

See application file for complete search history.

(56) References Cited

U.S. PATENT DOCUMENTS 6,744,426 B1 * 6/2004 Okamoto ............ G06F 3/03545
345/174
11,016,581 B2 * 5/2021 Jacobs ............... G06F 13/10
(Continued)

Primary Examiner — Fred Tzeng
(74) Attorney, Agent, or Firm — Barta Jones, PLLC

(57) ABSTRACT

Examples of the disclosure enable a docking station to provide various capabilities. In some examples, the docking station includes a sidewall at least partially defining a cavity, a charge module configured to charge a digital pen positioned within the cavity, and an authentication module configured to associate a digital pen with one or more user settings such that the digital pen is configured to operate in accordance with the user settings. Examples of the disclosure enable one or more digital pens to be placed in or retrieved from the docking station in a user-friendly manner.

20 Claims, 11 Drawing Sheets

(56) References Cited

U.S. PATENT DOCUMENTS

| | | | | |
|---|---|---|---|---|
| 11,211,975 B2 * | 12/2021 | Partovi | ............... | H02J 5/00 |
| 11,606,119 B2 * | 3/2023 | Partovi | ............... | H02J 50/402 |
| 2003/0076302 A1 * | 4/2003 | Langstraat | ............... | G06F 1/169 |
| | | | | 345/161 |
| 2004/0130915 A1 * | 7/2004 | Baarman | ............... | H02J 3/14 |
| | | | | 363/21.02 |
| 2004/0135765 A1 * | 7/2004 | Kinerk | ............... | G06F 1/169 |
| | | | | 345/156 |
| 2004/0212586 A1 * | 10/2004 | Denny, III | ............... | G06F 3/0354 |
| | | | | 345/156 |
| 2008/0141361 A1 * | 6/2008 | Balfanz | ............... | G06F 21/6227 |
| | | | | 726/16 |
| 2008/0167088 A1 * | 7/2008 | Rabu | ............... | H02J 7/0044 |
| | | | | 710/100 |
| 2011/0050164 A1 * | 3/2011 | Partovi | ............... | H02J 50/402 |
| | | | | 320/108 |
| 2012/0027265 A1 * | 2/2012 | Black | ............... | G06F 3/03545 |
| | | | | 382/117 |
| 2012/0242603 A1 * | 9/2012 | Engelhardt | ............... | G06F 21/32 |
| | | | | 345/173 |
| 2013/0093388 A1 * | 4/2013 | Partovi | ............... | H01F 38/14 |
| | | | | 320/108 |
| 2013/0165046 A1 * | 6/2013 | Tang | ............... | H02J 50/05 |
| | | | | 455/41.2 |
| 2014/0103868 A1 * | 4/2014 | Gilbert | ............... | H02J 50/10 |
| | | | | 320/108 |
| 2014/0247006 A1 * | 9/2014 | Yu | ............... | H01F 38/14 |
| | | | | 320/108 |
| 2014/0375186 A1 * | 12/2014 | Tarnow | ............... | F16M 11/041 |
| | | | | 206/576 |
| 2015/0378455 A1 * | 12/2015 | Immel | ............... | G06F 3/0393 |
| | | | | 345/179 |
| 2016/0072327 A1 * | 3/2016 | Knutson | ............... | H02J 7/025 |
| | | | | 320/108 |
| 2016/0147316 A1 * | 5/2016 | Ashcraft | ............... | G06F 3/0393 |
| | | | | 345/179 |
| 2021/0278913 A1 * | 9/2021 | Jacobs | ............... | H02J 7/0044 |

\* cited by examiner

BASE STATION FOR USE WITH DIGITAL PENS

CROSS-REFERENCE TO RELATED APPLICATION

This application is a continuation application of and claims priority to U.S. patent application Ser. No. 14/692,735, entitled "BASE STATION FOR USE WITH DIGITAL PENS," filed on Apr. 21, 2015, the disclosure of which is incorporated herein by reference in its entirety.

BACKGROUND

Some known interactive displays include a digital pen docking station that is configured to retain a limited number of digital pens. For example, at least some known docking stations include a single-pen-sized trough sized to accommodate only one digital pen at a time. Docking a digital pen onto such docking stations requires precise alignment of the digital pen (e.g., for ensuring contact with charging pads) and, as such, may be tedious, cumbersome, or time-consuming.

When using known docking stations configured to retain only a limited number of digital pens, a user may need to retrieve a new digital pen each time a digital pen is misplaced or damaged. Furthermore, such docking stations may not be conducive to collaborative efforts involving a plurality of users. The users may share a common digital pen, thereby limiting a number of users that may interact with the interactive display or, alternatively, each user may have a respective digital pen to interact with the interactive display but not have a respective docking station onto which the digital pen may be placed in between interactions.

BRIEF DESCRIPTION OF THE DRAWINGS

Corresponding reference characters indicate corresponding parts throughout the drawings.

DETAILED DESCRIPTION

Examples of the disclosure enable a docking station to provide various capabilities including, without limitation, storing a digital pen, charging a digital pen, associating a digital pen with one or more user settings, authenticating a user of a digital pen, syncing data between a digital pen and a computing device, creating/updating a user account associated with a user of a digital pen, adjusting an operating parameter associated with a digital pen, and providing teleconferencing functionalities. Some examples include a base station (e.g., a docking station) including a sidewall at least partially defining a cavity, a charge module configured to charge a digital pen positioned within the cavity, and an authentication module configured to associate a digital pen with one or more user settings such that the digital pen is configured to operate in accordance with the user settings.

Aspects of the disclosure enable a peripheral device, such as a digital pen or stylus, to be efficiently and effectively used across a plurality of user devices. In some examples, a digital pen may be retrieved from a base station storing a plurality of digital pens in a user-friendly manner for use with one or more user devices. After use, the digital pen may be placed in the base station to charge the digital pen or synchronize data between the digital pen and a user device. In this way, the base station may be conducive to collaborative efforts involving a plurality of users who may use a plurality of digital pens. By incorporating a docking station with various features in the manner described in this disclosure, some examples improve usability, enhance reliability, improve communication between mobile devices, increase system functionality, improve user efficiency via user interface interaction, increase user interaction performance, and/or reduce error rate.

Figure 1:
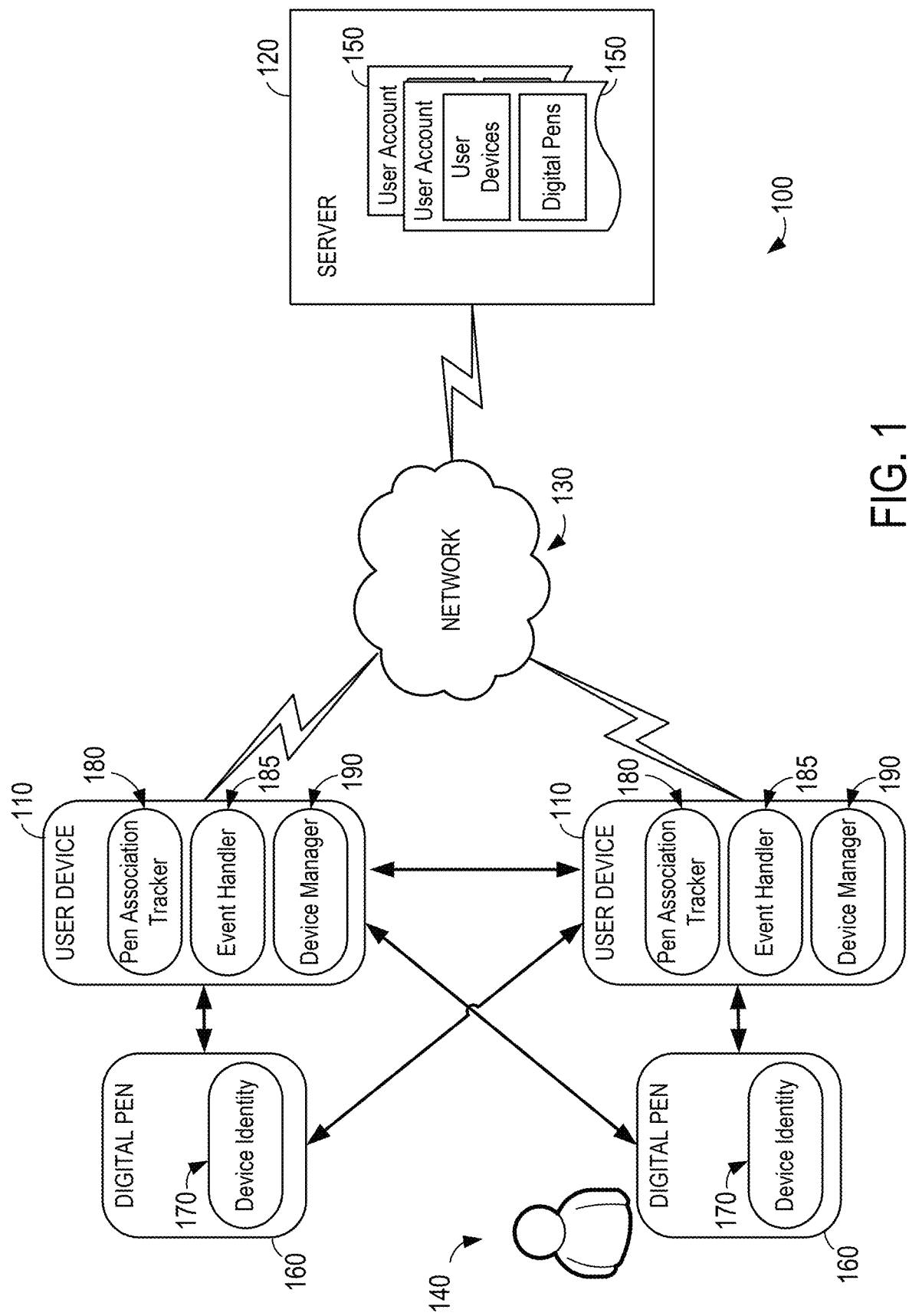
FIG. 1 is a diagram illustrating an example environment for managing an operation of a peripheral device.

FIG. 1 is a diagram illustrating an example environment 100 that includes one or more user devices 110 (e.g., base station, tablet, smartphone, television, video game console, desktop, laptop, interactive whiteboard). A server 120 is coupled to the user devices 110. In some examples, the server 120 is a cloud-based server coupled to the user device 110 via a network 130. The network 130 includes wireless and/or wired communication protocols and enables a user device 110 to communicate with the server 120 or with other user devices 110. Alternatively, the server 120 may be coupled to the user device 110 or the user devices 110 may be coupled to each other in any manner that enables the environment 100 to function as described herein.

A user 140 may access a user account 150 associated with the user 140 by logging on to one or more user devices 110 (e.g., by providing a login name and password), such that the user devices 110 are associated with the user 140 or the user account 150. A user device 110 remains associated with the user account 150 until the user device 110 is disassociated from the user account 150. Additionally or alternatively, the user device 110 may remain associated with the user account 150 until a predetermined event occurs or a predetermined amount of time lapses since logging on to the user devices 110.

The server 120 is configured to store or manage one or more user accounts 150, such that the user 140 may access the user account 150 by logging on to any user device 110 coupled to the server 120. Alternatively, the user account 150 may be stored at any location that enables the environment 100 to function as described herein. The user account 150 may be associated with or include one or more user settings (e.g., user preferences) that enable one or more functionalities of the user devices 110 to be customized.

User settings may include, for example, one or more of an operating mode (e.g., function loadout such as write, erase, highlight), a font, an ink color, a font size, a pen pressure curve, a pen-button assignment (e.g., function loadout for the buttons), or a device priority.

The user 140 may access the user account 150 via the user device 110 to create or update one or more user settings. The user settings are added, removed, or edited locally at the user device 110. In at least some examples, the user device 110 transmits a signal associated with the addition, removal, or editing of one or more user settings to the server 120 and, based on the signal, the server 120 creates or updates the user settings. The server 120 may transmit the created or updated user settings to one or more user devices 110 associated with the user account 150, such that the user devices 110 are configured to operate in accordance with the user setting. The user device 110 may directly transmit a signal associating one or more user settings with one or more other user devices 110, and the other user devices 110 may recognize the user settings.

A first user device 110 may be coupled to a second user device 110, such that the first user device 110 is configured to interact with the second user device 110. The user 140 may provide user input to the first user device 110 and affect an operation of the second user device 110. In at least some examples, the first user device 110 is coupled to the second user device 110 via the network 130 or server 120. Alternatively, the first user device 110 may be coupled to the second user device 110 in any manner that enables the environment 100 to function as described herein.

One or more peripheral devices (e.g., digital pens 160) are coupleable to the user device 110, such that the digital pen 160 is configured to interact with the user device 110. The user 140 may provide user input to the user device 110 via the digital pen 160. Additionally or alternatively, the user device 110 may present user output to the user 140 via the digital pen 160. In at least some examples, the user 140 uses the digital pen 160 to provide input to an application executing on the user device 110 by selecting, highlighting, erasing, or writing on a display surface (e.g., a digitizing flat panel display) of the user device 110. Alternatively, the user 140 may use the digital pen 160 to interact with the user device 110 in any manner that enables the environment 100 to function as described herein. While some examples of the disclosure are illustrated and described herein with reference to a peripheral device being a digital pen 160, aspects of the disclosure are operable with any peripheral device that interacts with the user device 110. The peripheral device may be a keyboard, a mouse, a remote control, a monitor, a speaker, a printer, or other peripheral devices.

The digital pen 160 may be paired with or coupled to the user device 110, such that the digital pen 160 is identified or recognized as a device authorized to interact with the user device 110. In at least some examples, the digital pen 160 transmits a signal indicating a presence of the digital pen 160 or requesting a secure connection, and the user device 110 detects the signal, acknowledges the presence of the digital pen 160, and confirms the secure connection. For example, a device identity 170 identifying the digital pen 160 is transmitted from the digital pen 160 to the user device 110, and the user device 110 compares the device identity 170 to an expected value (e.g., using a hashing algorithm or lookup table) to determine an integrity of the device identity 170.

The digital pen 160 may be paired to the user device 110 using any device-to-device interaction protocol such as BLUETOOTH brand wireless technology standard, WI-FI brand local area wireless technology, WI-FI DIRECT brand Wi-Fi standard, ZIGBEE brand communication standard, near field communication (NFC) technology, received signal strength indicator (RSSI) technology, or proprietary radio protocols (BLUETOOTH is a trademark of Bluetooth Special Interest Group, WI-FI and WI-FI DIRECT are trademarks of the Wi-Fi Alliance, and ZIGBEE is a trademark of the ZigBee Alliance). The user device 110 may include a pen association tracker 180 that detects/identifies the digital pen 160 in accordance with a technology stack that manages or controls communication between the digital pen 160 and the user device 110. Alternatively, the digital pen 160 may be paired with or coupled to the user device 110 in any manner that enables the environment 100 to function as described herein.

The digital pen 160 is associated with a unique device identity 170 (e.g., serial number, media access control or MAC address unique among other digital pens 160) that uniquely identifies the digital pen 160. The device identity 170 may include or be associated with a BLUETOOTH brand address. Alternatively, the digital pen 160 may be identified in any manner that enables the environment 100 to function as described herein. In at least some examples, the user device 110 generates a notification indicating or confirming that the digital pen 160 is an authorized device (e.g., that the device identity 170 is associated with the user device 110).

The digital pen 160 may be associated with the user 140 or the user account 150, such that the user 140 may use the digital pen 160 with any user device 110 associated with the user 140 or the user account 150. The server 120 may be configured to associate the device identity 170 with the user account 150, such that the digital pen 160 is configured to interact with any user device 110 associated with the user account 150. In at least some examples, a user device 110 transmits, to the server 120, a signal indicating that the digital pen 160 is authorized to interact with the user device 110 and, based on the signal, a server 120 associates the digital pen 160 with a user account 150 associated with the user device 110.

The server 120 is configured to identify one or more user devices 110 associated with the user account 150, associate the device identity 170 with the user devices 110 such that the digital pen 160 is configured to interact with the user devices 110 (e.g., the digital pen 160 is authorized to interact with one or more user devices 110 associated with the user account 150), and transmit, to the user devices 110, a signal indicating the association of the device identity 170 with the user device 110. A user device 110 may generate a notification indicating that the digital pen 160 is an authorized device (e.g., the digital pen 160 is paired or coupled with the user device 110). In at least some examples, the user device 110 identifies the digital pen 160 as an authorized device without manually pairing the digital pen 160 with the user device 110. The user device 110 is configured to track a list of digital pens 160 (e.g., through device identities 170) and manage an interaction with the digital pens 160 on the list.

The device identity 170 may be selectively associated with one or more user devices 110, such that the digital pen 160 is configured to interact with the selectively associated user devices 110. For example, the device identity 170 may be associated with a first set of user devices 110, such that the digital pen 160 is configured to interact with each user device 110 of the first set of user devices 110 and/or is not associated with a second set of user devices 110, such that the digital pen 160 is not configured to interact with each user device 110 of the second set of user devices 110.

The digital pen 160 is configured to receive user input from the user 140 and transmit a signal associated with the user input to the user device 110. A digital pen 160 may signal an event or action (e.g., click) by transmitting a BLUETOOTH brand low energy advertising packet including the device identity 170 and a customized command payload. In at least some examples, the user device 110 includes an event handler 185 configured to process the user input in accordance with a technology stack that manages or controls communication between a peripheral device (e.g., digital pen 160) and the user device 110. The user device 110 may receive the advertising packet, decode the command payload, or perform a desired action associated with the command payload (e.g., launch a desired application).

The user device 110 may determine whether to perform the desired action based on one or more parameters. For example, the user device 110 may determine whether to execute the operation based on a proximity of the digital pen 160 to the user device 110. As advertising packets are sent to and received by any compatible device (e.g., any device configured to use BLUETOOTH brand technology) without establishing a connection, in at least some examples, the user devices 110 and the digital pens 160 may interact with each other without previous encounter or knowledge of each other.

In at least some examples, a plurality of user devices 110 receive the signal associated with the user input, and each user device 110 decodes the command payload or performs a desired action associated with the command payload (e.g., launch a desired application) independent of the other user devices 110. A plurality of user devices 110 may receive the signal associated with the user input, and one or more user devices 110 may determine whether to decode the command payload or perform a desired action associated with the command payload based on one or more parameters. In at least some examples, a user device 110 transmits a signal associated with the user input to the server 120, and the server 120 identifies one or more user devices 110 that are to decode the command payload or perform a desired action associated with the command payload.

The user device 110 may use received signal strength indicator (RSSI) technology to make intelligent operational or functional decisions. A user device 110 may use RSSI-threshold monitoring to design algorithms that determine whether a single user device 110 or multiple user devices 110 take action in response to receiving an advertising packet. For data transfers that require secure data channels, the user device 110 may initiate establishing a connection with the digital pen 160 in response to the advertising packet and switch to a secure connection mode. The connection may then be dissolved after the data transfer, and the user device 110 may switch back to an advertising mode.

In some examples, the user device 110 includes a device manager 190 that enables the user device 110 to create or manage device configurations associated with a device (e.g., user device 110, digital pen 160). The user 140 may add, remove, edit, or update one or more device configurations associated with the digital pen 160. In at least some examples, the device manager 190 includes or is coupled to a bus controller that enables one or more digital pens 160 to communicate with each other with little or no intervention from the user device 110.

The device identity 170 may be disassociated from the user device 110 (e.g., the digital pen 160 is unpaired or decoupled from the user device 110), such that the digital pen 160 is not configured to interact with the user device 110. In at least some examples, the user device 110 transmits, to the server 120, a signal indicating that the digital pen 160 is not authorized to interact with the user device 110 (e.g., a disassociation of the device identity 170 from the user device 110). Based on the signal, the server 120 disassociates the digital pen 160 from a user account 150 associated with the user device 110, such that the digital pen 160 is not configured to interact with the remaining user devices 110 associated with the user account 150 (e.g., the digital pen 160 is unpaired or decoupled from each user device 110 associated with the user account 150). That is, a digital pen 160 may be unpaired from a user device 110 without manually unpairing the digital pen 160 from the user device 110. A user device 110 may generate a notification indicating that the digital pen 160 is not an authorized device.

Figure 2:
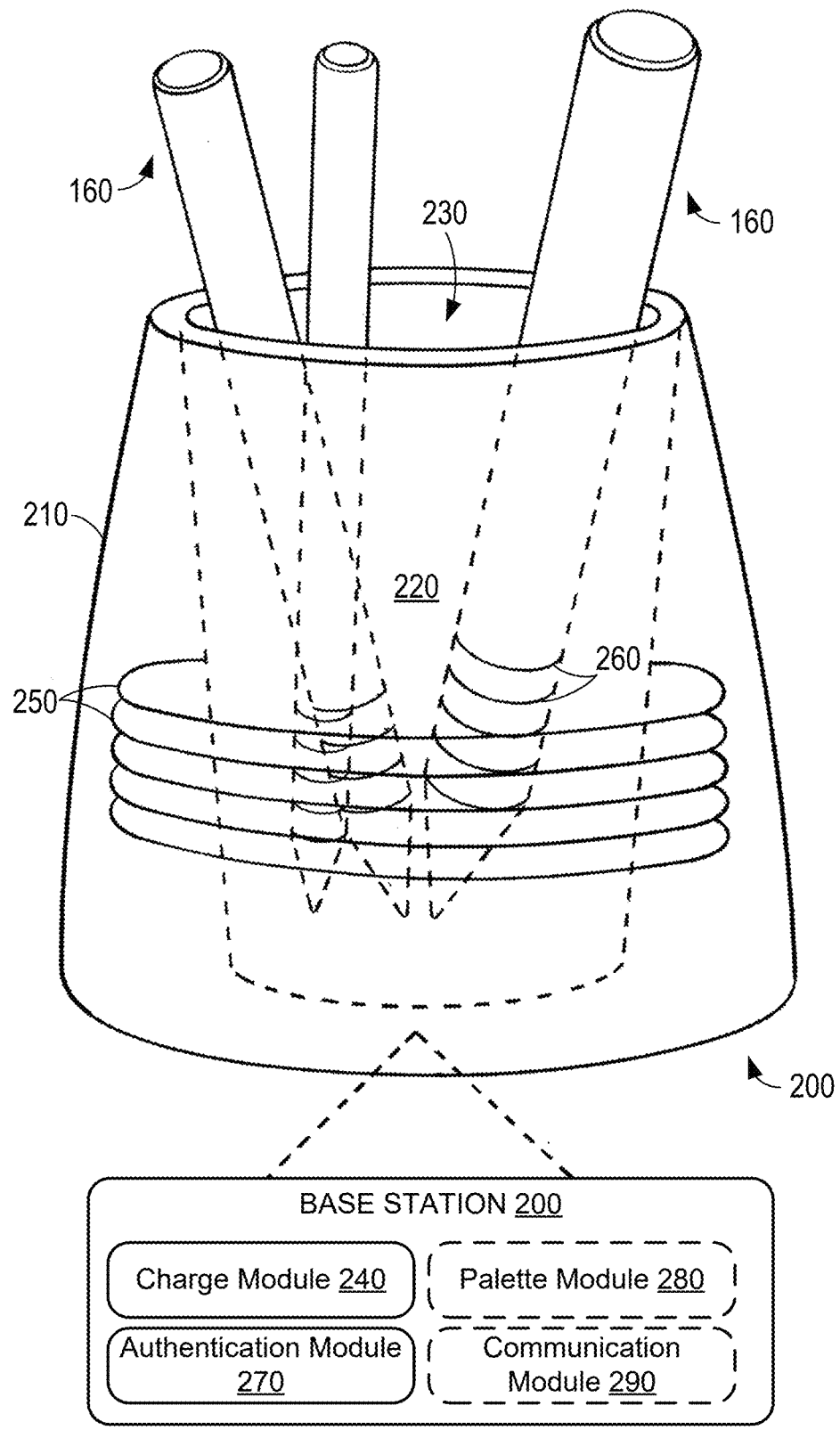
FIG. 2 is a diagram illustrating an example base station for managing an operation of a peripheral device in an environment, such as the environment shown in FIG. 1.
Figure 3:
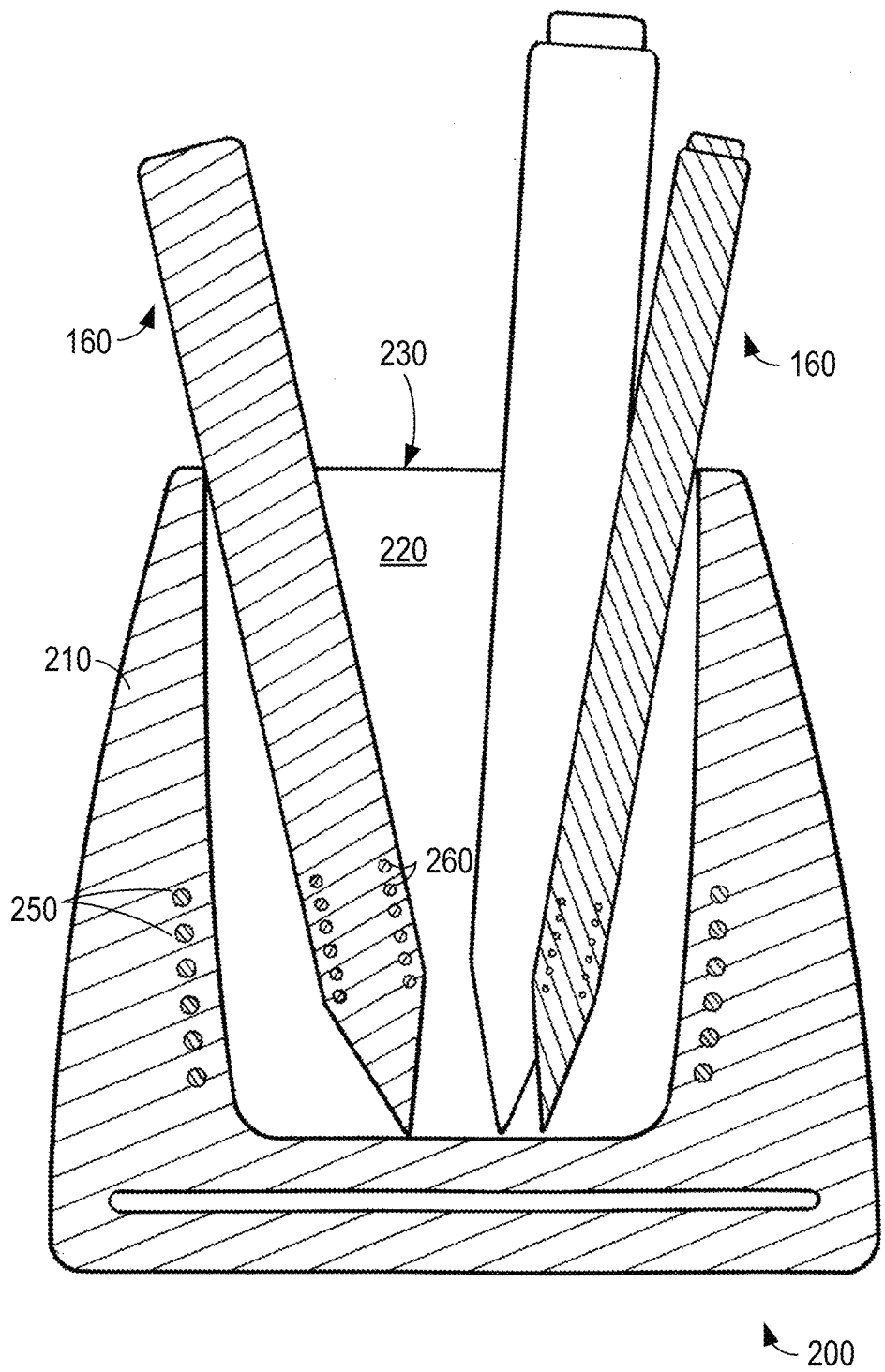
FIG. 3 is a cross-sectional diagram illustrating a base station, such as the base station shown in FIG. 2.

FIG. 2 is a diagram illustrating a base station 200 for managing an operation of a digital pen 160. FIG. 3 is a cross-sectional diagram illustrating the base station 200. The base station 200 includes a sidewall 210 that at least partially defines a cavity 220 sized to retain a plurality of digital pens 160 therein. In some examples, the sidewall 210 is generally cylindrical or frustoconical in shape and defines an opening 230 that enables a user 140 to position one or more digital pens 160 within the cavity 220 or remove one or more digital pens 160 from the cavity 220 in a user-friendly manner. A base station 200 used in a conference room may be configured to retain a plurality of whiteboard-style digital pens 160, and a base station 200 used in an artist studio may be configured to retain a plurality of paintbrush-style digital pens 160. Alternatively, the sidewall 210 may have any size or shape that enables the base station 200 to function as described herein.

The base station 200 includes a charge module 240 (shown in FIG. 2) that includes one or more first inductive rings 250. In some examples, the first inductive rings 250 are coupled to the sidewall 210 such that the first inductive rings 250 extend about the cavity 220. The charge module 240 is configured to determine whether a digital pen 160 is positioned within the cavity 220 and, upon determining that the digital pen 160 is positioned within the cavity, use the first inductive rings 250 to transmit energy towards the cavity 220 such that the charge module 240 charges the digital pen 160 through induction.

The charge module 240 may transform electric energy to magnetic energy, and one or more digital pens 160 may include one or more second inductive rings 260 configured to receive the magnetic energy and transform the magnetic energy to electric energy. In at least some examples, the digital pen 160 includes a predetermined number of second inductive rings 260 based on an electronic parameter (e.g., voltage) associated with the digital pen 160. Alternatively, the charge module 240 may use any near-field charging technology that enables the base station 200 to function as described herein. When the charge module 240 determines that no digital pens 160 are positioned within the cavity 220 or that all of the digital pens 160 positioned within the cavity 220 are fully charged, in at least some examples, the charge module 240 does not transmit energy towards the cavity 220.

The first inductive rings 250 may be spaced vertically along the sidewall 210 or extended about the cavity 220 such that the charge module 240 is aligned or oriented to charge digital pens 160 having various shapes, sizes, or configurations. The first inductive rings 250 may be spaced to interface with one or more second inductive rings 260 of a first digital pen 160 having a first configuration, and with one or more second inductive rings 260 of a second digital pen 160 having a second configuration different from the first configuration. Alternatively, the first inductive rings may be arranged in any alignment or orientation that enables the base station 200 to function as described herein.

The base station 200 includes an authentication module 270 (shown in FIG. 2) configured to receive input (e.g., a signal, a device identity 170) from the digital pen 160 and, based on the input, authorize the digital pen 160 to interact with the base station 200. The authentication module 270 may include a sensor configured to detect the digital pen 160 or a signal transmitted by the digital pen 160. In at least some examples, the authentication module 270 includes a pen association tracker 180 (shown in FIG. 1) that identifies the digital pen 160 or a signal transmitted by the digital pen 160 and pairs the digital pen 160 with the base station 200 such that the digital pen 160 is configured to interact with the base station 200.

The authentication module 270 may receive input (e.g., a username, a password) at the base station 200 or from the digital pen 160 and, based on the input, determine whether the user 140 of the digital pen 160 is associated with the user account 150. The authentication module 270 may authorize access to a corresponding user account 150 when it is determined that the user 140 of the digital pen 160 is associated with the user account 150. Upon authorizing access to a user account 150, the authentication module 270 may identify one or more user settings associated with the user account 150 and associate the base station 200 or the digital pen 160 with the user settings such that the base station 200 or the digital pen 160 is configured to operate in accordance with the user account 150 (e.g., user settings). In at least some examples, the user account 150 is created or edited based at least partially on input received by the authentication module 270.

Additionally or alternatively, the authentication module 270 may receive input (e.g., biometric data, signature recognition) at the base station 200 or from the digital pen 160 and, based on the input, authenticate the user 140. In addition to authorizing access to a corresponding user account 150, authenticating a user 140 verifies an identity of the user 140. The authentication module 270 may include a sensor that detects a thumbprint uniquely identifying a user 140 and, based on the thumbprint, authenticates the user 140. Additionally or alternatively, the digital pen 160 may be used to write or sign a name (e.g., a signature), and the signature may be compared with a predetermined, verified signature to determine whether to authenticate the user 140. An authorized, authenticated user 140 may have increased access to information or have increased privileges.

In some examples, the authentication module 270 generates a provisional or temporary user account 150 that enables the digital pen 160 to be customized (e.g., to change user settings) without associating the customizations with a particular user account 150 (e.g., a unique user account 150). The digital pen 160 may be associated with the provisional user account 150 and its customizations until a predetermined event occurs (e.g., a user 140 logs onto the user account 150) or a predetermined amount of time lapses (e.g., the digital pen 160 is dormant or not used for a predetermined amount of time).

The authentication module 270 is configured to couple the base station 200 to another user device 110 (shown in FIG. 1) such that the base station 200 is configured to interact with the user device 110. The user 140 may provide user input to the base station 200 (e.g., change a user setting) and affect an operation of the user device 110 (e.g., change how the user device 110 interacts with the digital pen 160). The base station 200 may be coupled to the user device 110 directly, via the network 130 (shown in FIG. 1), or via the server 120 (shown in FIG. 1). Alternatively, the base station 200 may be coupled to the user device 110 in any manner that enables the environment 100 (shown in FIG. 1) to function as described herein.

The base station 200 provides a connection point for a near-field wireless communication protocol to upload data to or download data from the digital pen 160. In at least some examples, the authentication module 270 wirelessly synchronizes data between the digital pen 160 and the base station 200. The authentication module 270 may be configured to compare data captured by or stored at the digital pen 160 with data stored at the base station 200, identify differences between the digital pen data and the base station data, and update the digital pen data or the base station data (e.g., download data from a source device and upload data to a destination device) such that at least some digital pen data is substantially similar to the corresponding base station data. Additionally or alternatively, the authentication module 270 may be configured to synchronize data between the base station 200 and a user device 110 or the server 120. The authentication module 270 may use a wireless technology, such as inductive technology, BLUETOOTH brand technology, NFC technology, or ZIGBEE brand technology. In at least some examples, the authentication module 270 synchronizes the data while the digital pen 160 is positioned within the cavity 220. Alternatively, the authentication module 270 may synchronize the data anytime that enables the environment 100 to function as described herein.

The base station 200 may include a palette module 280 (shown in FIG. 2) that enables a user 140 to adjust an operating parameter associated with the digital pen 160 and/or include a communication module 290 (shown in FIG. 2) that enables a user 140 to communicate with a remote user. FIGS. 4-7 illustrate various implementations of a palette that may be used with the base station 200. FIG. 8 illustrates one implementation of teleconferencing technology that may be used with the base station 200.

Figure 4:
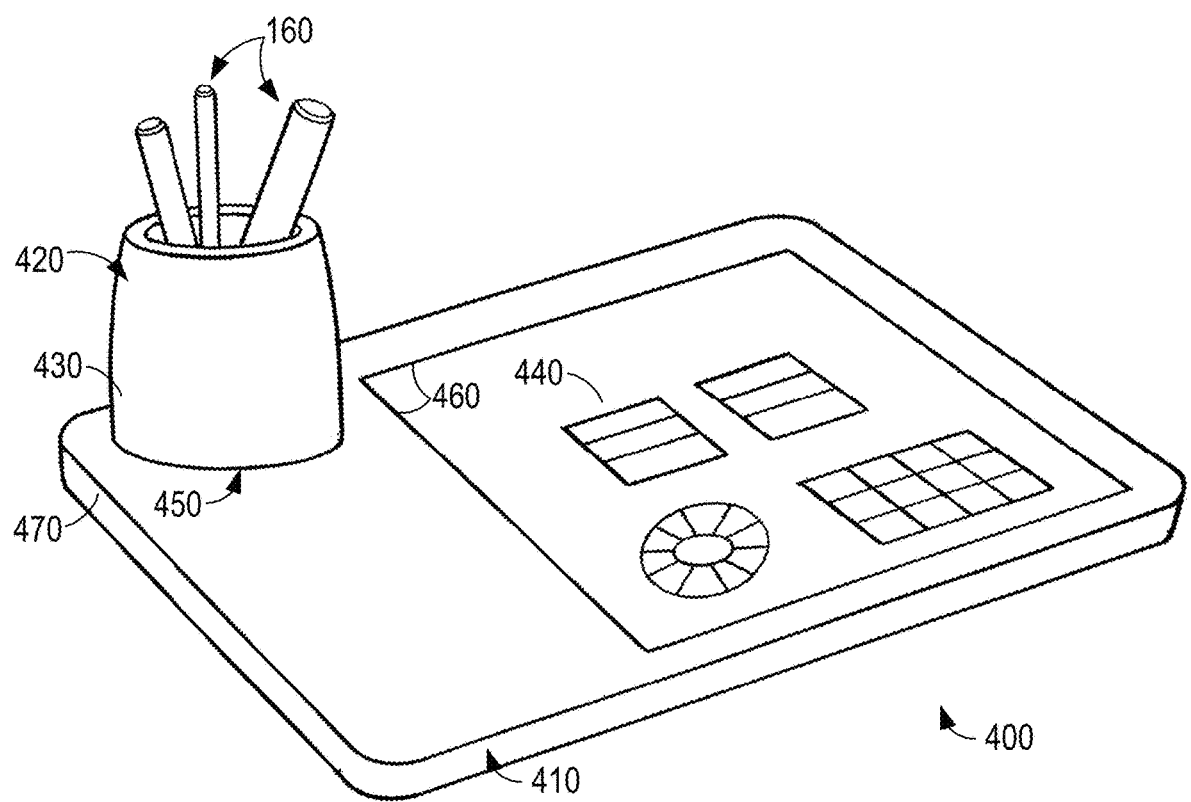
FIGS. 4 and 5 are diagrams illustrating example palette devices and base stations, such as the base station shown in FIG. 2, including example palette modules that may be used with the palette devices.

FIG. 4 illustrates a system 400 including a palette device 410 (e.g., a first user device) configured to interact with a digital pen 160, and a base station 420 (e.g., a second user device) that may be used with the palette device 410. Similar to the base station 200, the base station 420 is configured to retain a plurality of digital pens 160 and includes a sidewall 430, a charge module (not shown), an authentication module (not shown), and a palette module (not shown). The sidewall 430, the charge module, the authentication module, and the palette module of the base station 420 are substantially similar to the sidewall 210, the charge module 240, the authentication module 270, and the palette module 280, respectively, of the base station 200.

The palette module is configured to interface with the palette device 410. The palette device 410 includes a display screen 440 configured to present one or more display images, and a cutout 450 sized and shaped to retain or house at least a portion of the base station 420. In some examples, the palette device 410 and the display screen 440 are each substantially planar and quadrilateral (e.g., rectangular) in shape. The cutout 450 may be positioned adjacent one or more edges 460 (e.g., a corner) of the display screen 440 or one or more edges 470 of the palette device 410. Positioning the cutout 450 adjacent edges 460 and/or 470 enables a user 140 to easily move a digital pen 160 between the base station 420 and the display screen 440. Alternatively, the cutout 450 may be positioned in any location that enables the system 400 to function as described herein.

In some examples, the display screen 440 is a capacitive touch screen configured to detect pressure applied to the display screen 440. The sensors may be touch sensitive (e.g., sensitive to a finger of the user 140) or pen sensitive (e.g., sensitive to the digital pen 160). The palette device 410 may include one or more sensors spaced or positioned about the display screen 440, such that the palette device 410 is configured to identify a location of the display screen 440 on which the pressure is applied.

The palette device 410 serves as a digital palette and presents one or more options on the display screen 440, detects pressure applied to the display screen 440 using the sensors, identifies a location of the applied pressure on the display screen 440, and identifies one or more operations associated with the location of the applied pressure. The palette device 410 transmits a signal associated with the operations to the palette module and, based on the signal, the base station 420 identifies one or more operations, and performs the operations. A user 140 may select a color from a color wheel presented on the display screen 440 and, based on the selection, an ink color (e.g., an operating parameter) may be adjusted or changed to the selected color. Alternatively, the palette device 410 may present or receive any option that enables the system 400 to function as described herein.

Figure 5:
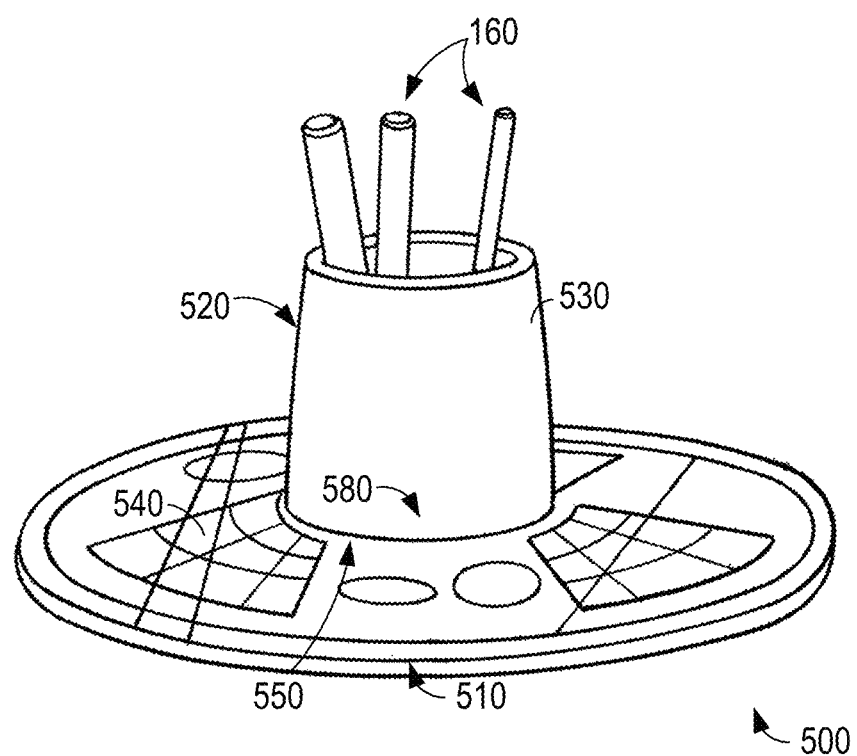

FIG. 5 illustrates a system 500 including a palette device 510 (e.g., a first user device) configured to interact with a digital pen 160, and a base station 520 (e.g., a first user device) that may be used with the palette device 510. Similar to the base station 200, the base station 520 is configured to retain a plurality of digital pens 160 and includes a sidewall 530, a charge module (not shown), an authentication module (not shown), and a palette module (not shown). The sidewall 530, the charge module, the authentication module, and the palette module of the base station 520 are substantially similar to the sidewall 210, the charge module 240, the authentication module 270, and the palette module 280, respectively, of the base station 200.

The palette module is configured to interface with the palette device 510. Similar to the palette device 410, the palette device 510 includes a display screen 540 configured to present one or more display images, and a cutout 550 sized and shaped to retain or house at least a portion of the base station 520. The display screen 540 and the cutout 550 are substantially similar to the display screen 440 and the cutout 450, respectively, of the palette device 410, with like elements having like numbers. Unlike the palette device 410 or the display screen 440, the palette device 510 and the display screen 540 are each substantially planar and round (e.g., circular) in shape. In some examples, the cutout 550 is positioned at approximately a center 580 of the display screen 540 or of the palette device 510. Positioning the cutout 550 at the center 580 enables a user 140 to easily move a digital pen 160 between the base station 520 and the display screen 540. Alternatively, the cutout 550 may be positioned in any location that enables the system 500 to function as described herein.

Figure 6:
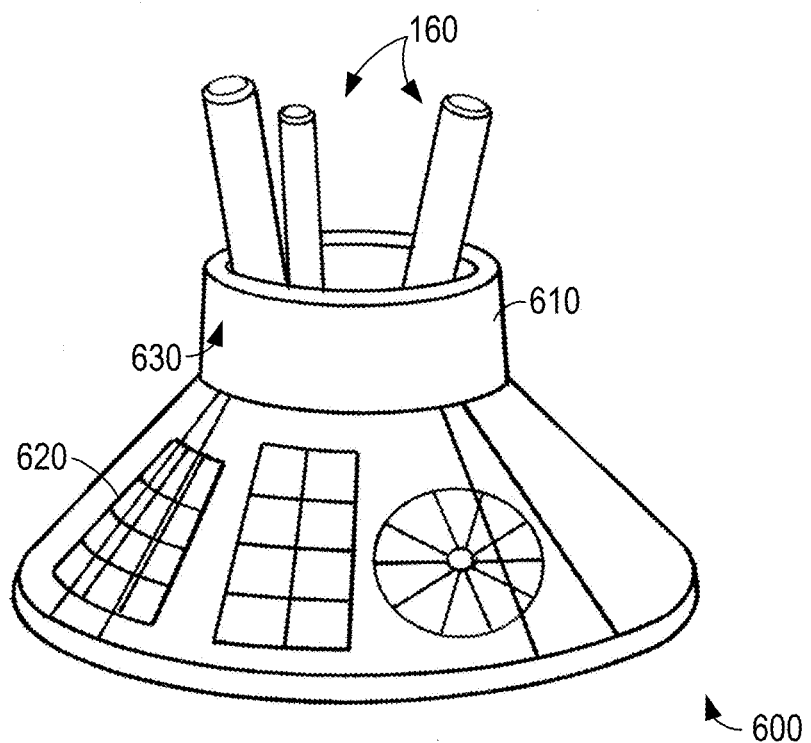
FIGS. 6 and 7 are diagrams illustrating example base stations, such as the base station shown in FIG. 2, including example palette modules.

FIG. 6 illustrates a base station 600. Similar to the base station 200, the base station 600 is configured to retain a plurality of digital pens 160 and includes a sidewall 610, a charge module (not shown), an authentication module (not shown), and a palette module (not shown). The sidewall 610, the charge module, the authentication module, and the palette module of the base station 600 are substantially similar to the sidewall 210, the charge module 240, the authentication module 270, and the palette module 280, respectively, of the base station 200. Unlike the base station 200, the base station 600 or, more particularly, the palette module includes a display screen 620 configured to present one or more display images. The display screen 620 is coupled to and extends about an outer surface 630 of the sidewall 610. The display screen 620 is substantially frustoconcial in shape. Alternatively, the display screen 620 may have any shape or configuration that enables the base station 600 to function as described herein.

In some examples, the display screen 620 is a capacitive touch screen configured to detect pressure applied to the display screen 620. The sensors may be touch sensitive (e.g., sensitive to a finger of the user 140) or pen sensitive (e.g., sensitive to the digital pen 160). The palette module may include one or more sensors spaced or positioned about the display screen 620, such that the palette module is configured to identify a location of the display screen 620 on which the pressure is applied.

The palette module serves as a digital palette and presents one or more options on the display screen 620, detects a pressure applied to the display screen 620 using the sensors, identifies a location of the applied pressure on the display screen 620, identifies one or more operations associated with the location of the applied pressure, and performs the operations. A user 140 may select a color from a color wheel presented on the display screen 620 and, based on the selection, an ink color (e.g., an operating parameter) may be adjusted or changed to the selected color. Alternatively, the base station 600 may present or receive any option that enables the base station 600 to function as described herein.

Figure 7:
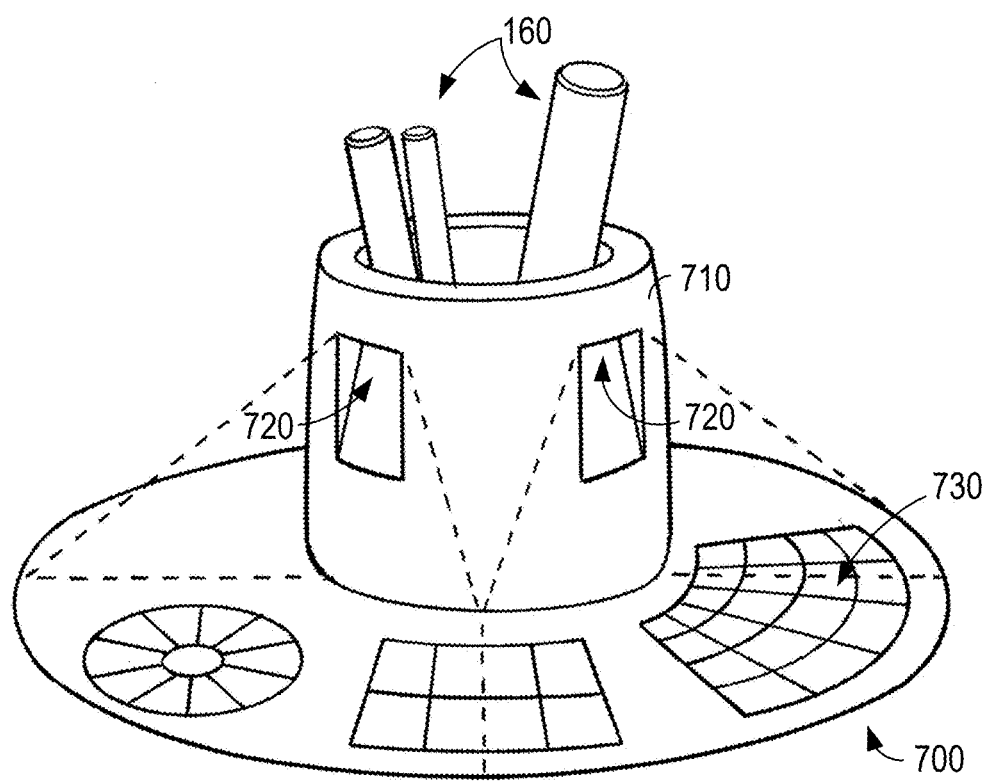
Figure 8:
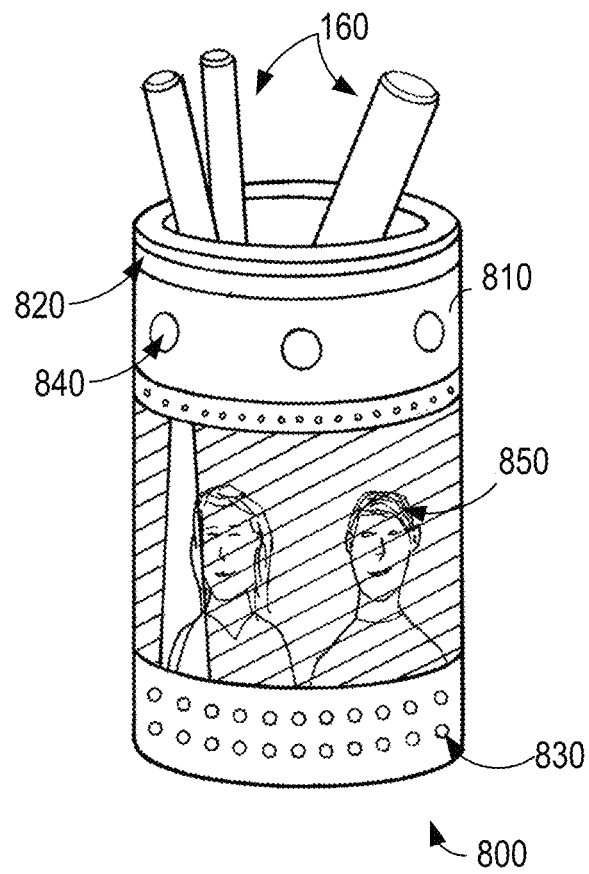
FIG. 8 is a diagram illustrating an example base station, such as the base station shown in FIG. 2, including an example communication module.

FIG. 7 illustrates a base station 700. Similar to the base station 200, the base station 700 is configured to retain a plurality of digital pens 160 and includes a sidewall 710, a charge module (not shown), an authentication module (not shown), and a palette module (not shown). The sidewall 710, the charge module, the authentication module, and the palette module of the base station 700 are substantially similar to the sidewall 210, the charge module 240, the authentication module 270, and the palette module 280, respectively, of the base station 200. Unlike the base station 200, the base station 700 or, more particularly, the palette module includes one or more projectors 720 configured to project/present one or more display images onto a surface 730 (e.g., a tabletop), and one or more sensors configured to detect/identify a location of an object (e.g., a fingertip of the user 140 or a tip of the digital pen 160) positioned on or adjacent to the surface 730. An array of projectors 720 spaced about a perimeter of the sidewall 710 may be used to project a continuous image about the perimeter of the sidewall 710. In at least some examples, one or more projectors 720 are short-throw projectors that are positioned adjacent to the surface 730 to reduce an opportunity or likelihood of an object (e.g., a hand of the user 140, a digital pen 160) to obstruct the projection. A projector 720 and a sensor may be integrated in a common component.

In this manner, the palette module is configured to project one or more images that serve as a virtual palette, present one or more options on the surface 730, detect a location of an object positioned on or adjacent to the surface 730, identify one or more operations associated with the location of the object, and perform the operations. For example, a user 140 may select a color from a color wheel presented on the surface 730, and the palette module may adjust or change an ink color (e.g., an operating parameter) to the selected color. Alternatively, the base station 700 may present or receive any option that enables the base station 700 to function as described herein.

While some examples of the disclosure are illustrated and described herein with reference to a palette device being a dedicated palette device (e.g., FIGS. 4 and 5) or an integrated component of the base station (e.g., FIGS. 6 and 7), aspects of the disclosure are operable with any user device 110 that interacts with a user 140. For example, the palette device may be a portable media player, a mobile telephone, a tablet, a netbook, a laptop, a desktop computer, a computing pad, a kiosk, a tabletop device, an industrial control device, a wireless charging station, an electric automobile charging station, and other computing devices.

FIG. 8 illustrates a base station 800. Similar to the base station 200, the base station 800 is configured to retain a plurality of digital pens 160 and includes a sidewall 810, a charge module (not shown), an authentication module (not shown), and a communication module (not shown). The sidewall 810, the charge module, the authentication module, and the communication module of the base station 800 are substantially similar to the sidewall 210, the charge module 240, the authentication module 270, and the communication module 290, respectively, of the base station 200.

In some examples, the communication module includes one or more sensors coupled to and spaced about a perimeter the sidewall 810. The sensors may include one or more audio sensors 820 (e.g., microphones) configured to detect a first parameter (e.g., sound or audio input). Additionally or alternatively, the sensors may include one or more video sensors 840 (e.g., cameras) configured to detect a second parameter (e.g., visible light or video input).

In some examples, the communication module includes one or more projectors coupled to and spaced about the perimeter of the sidewall 810. The projectors may include one or more audio projectors 830 (e.g., speakers) configured to present/project the first parameter (e.g., sound or audio output). Additionally or alternatively, the projectors may include one or more video projectors 850 (e.g., display screens) configured to present/project the second parameter (e.g., visible light, images, or video output). In at least some examples, an array of video projectors 850 are spaced about the perimeter of the sidewall 810 such that a continuous image may be presented about the perimeter of the sidewall 810. The video projectors 850 may be or include curved display screens using, for example, organic light-emitting diode technology. Alternatively, the sensors 820, 830 or projectors 840, 850 may use any technology or be positioned in any location that enables the system 800 to function as described herein.

The base station 800 may be coupled to a remote device (e.g., user device 110). The parameters detected by the sensors 820, 840 (e.g., local audiovisual content) may be transmitted to the remote device, and parameters detected by the remote device (e.g., remote audio visual content) may be presented/projected by the projectors 830, 850. In at least some examples, the base station 800 generates a first signal associated with the local audiovisual content for transmission to the remote device, and the remote device generates a second signal associated with the remote audiovisual content, which is received by the base station 800.

Figure 9:
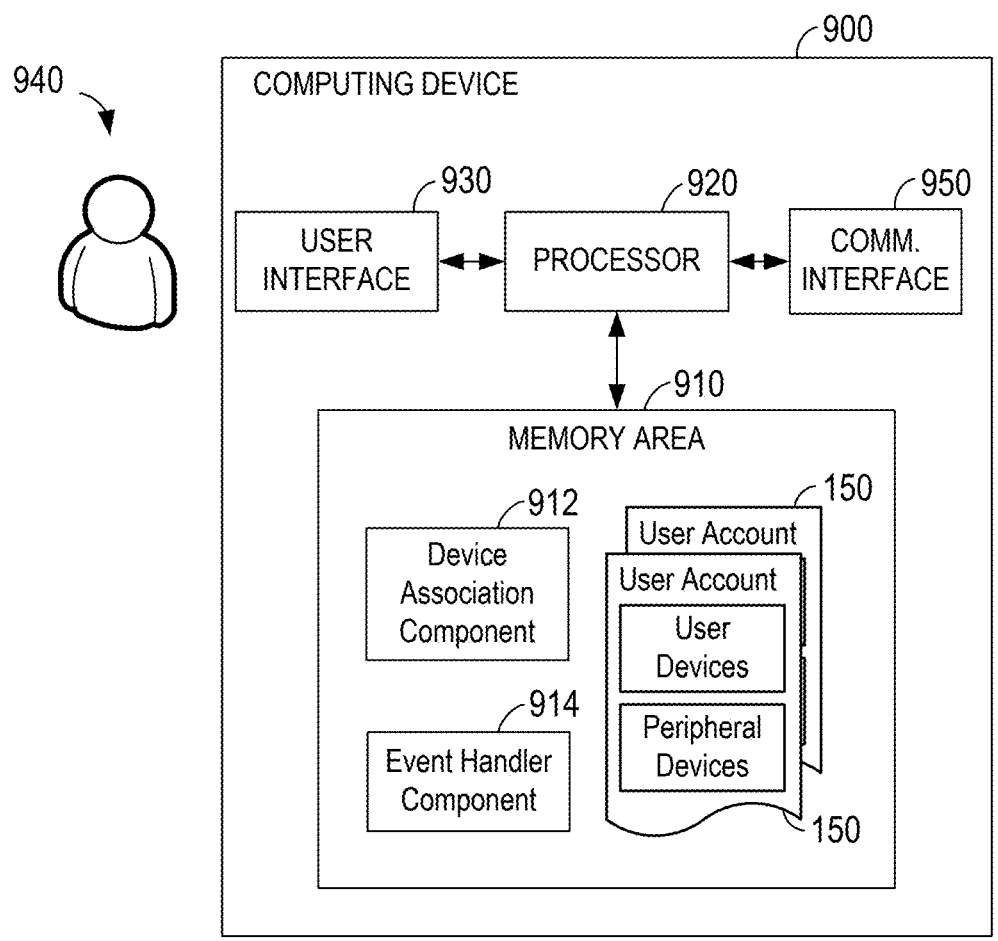
FIG. 9 is a schematic diagram illustrating an example computing device that may be used in an environment, such as the environment shown in FIG. 1.

FIG. 9 is a schematic diagram illustrating an example computing device 900 (e.g., user device 110, server 120, digital pen 160, base station 200, 420, 520, 600, 700, 800, palette device 410, 510). While some examples of the disclosure are illustrated and described herein with reference to a computing device being a user device, a server, a digital pen, a base station, or a palette device, aspects of the disclosure are operable with any computing device or server that executes instructions to implement the operations and functionality associated with the computing device or server. The computing device 900 may include a portable media player, a mobile telephone, a tablet, a netbook, a laptop, a desktop computer, a computing pad, a kiosk, a tabletop device, an industrial control device, a wireless charging station, an electric automobile charging station, and other computing devices. Additionally, the computing device 900 may represent a group of processing units or other computing devices. Additionally, any computing device described herein may be configured to perform any operation described herein including one or more operations described herein as being performed by another computing device.

The computing device 900 includes one or more computer-readable media, such as a memory area 910 storing computer-executable instructions, a device charge component 912, a device association component 914, user accounts 150, user settings, device identities, or other data, and one or more processors 920 programmed to execute the computer-executable instructions for implementing aspects of the disclosure. The memory area 910 includes any quantity of media associated with or accessible by the computing device. The memory area 910 may be internal to the computing device (as shown in FIG. 9), external to the computing device (not shown), or both (not shown).

The processor 920 includes any quantity of processing units, and the instructions may be performed by the processor 920 or by multiple processors within the computing device or performed by a processor external to the computing device. The processor 920 is programmed to execute instructions such as those illustrated in the figures (e.g., FIGS. 10 and 11).

The processor 920 is transformed into a special purpose microprocessor by executing computer-executable instructions or by otherwise being programmed. For example, the device charge component 912, when executed by the processor 920, causes the processor 920 to determine whether the peripheral device is positioned within a cavity at least partially defined by a sidewall and, upon determining that the peripheral device is positioned within the cavity, transmit energy towards the cavity to charge the peripheral device; and the device association component 914, when executed by the processor 920, causes the processor 920 to determine whether a peripheral device is associated with a user account and, upon determining that the peripheral device is associated with the user account, identify one or more user settings associated with the user account, and associate the peripheral device with the user settings such that the peripheral device is configured to operate in accordance with the user settings. Although the processor 920 is shown separate from the memory area 910, examples of the disclosure contemplate that the memory area 910 may be onboard the processor 920 such as in some embedded systems.

The computing device 900 may include at least one user interface 930 for exchanging data between the computing device 900 and a user 940. The user interface 930 includes or is coupled to a presentation device (not shown) configured to present information, such as text, images, audio, video, graphics, alerts, and the like, to the user 940. The presentation device may include, without limitation, a display, a speaker, or a vibrating component. Additionally or alternatively, the user interface 930 includes or is coupled to an input device (not shown) configured to receive information, such as user commands, from the user 940. The input device may include, without limitation, a controller, a camera, a microphone, or an accelerometer. In at least some examples, the presentation device and the input device are integrated in a common user interface 930 configured to present information to the user 940 and receive information from the user 940. The user-interface device may include, without limitation, a capacitive touch screen display, or a controller including a vibrating component.

The computing device 900 includes at least one communication interface 950 for exchanging data between the computing device 900 and a computer-readable media or another computing device. In at least some examples, the server 120 is coupled to the user device 110 and/or the digital pen 160 via the network 130. Communication between the computing device 900 and a computer-readable media or another computing device may occur using any protocol or mechanism over any wired or wireless connection.

The block diagram of FIG. 9 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 9 may be performed by other elements in FIG. 9, or an entity (e.g., processor, web service, server, applications, computing device, etc.) not shown in FIG. 9.

Figure 10:
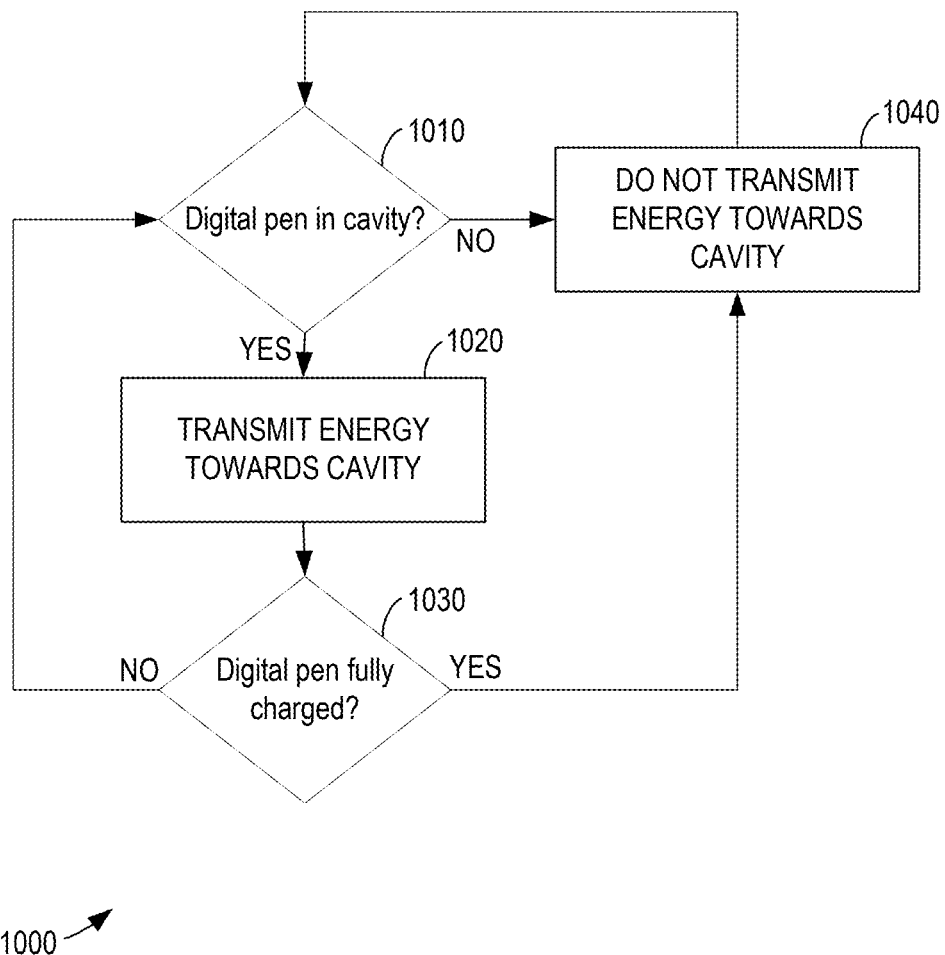
FIG. 10 is a flow chart illustrating an example method of managing an operation of a charge module using a computing device, such as the computing device shown in FIG. 9.

FIG. 10 is a flow chart illustrating an example method 1000 of managing an operation of a charge module 240. It is determined at 1010 whether one or more digital pens 160 are positioned in a cavity 220 at least partially defined by a base station sidewall 210. Upon determining that one or more digital pens 160 are positioned within the cavity 220, a base station charge module 240 transmits energy towards the cavity 220 at 1020 to charge the digital pens 160 positioned within the cavity 220. In at least some examples, upon determining at 1030 that each digital pen 160 positioned within the cavity 220 is fully charged, the charge module 240 does not transmit or ceases transmission of energy at 1040.

The digital pens 160 are removable from the cavity 220 for use with one or more user devices 110. For example, one or more users 140 may remove one or more digital pens 160 to use the digital pens 160 with an interactive whiteboard. In at least some examples, the digital pens 160 are paired with the user device 110, such that the digital pens 160 are configured to interact with the user device 110. The digital pens 160 may operate in accordance with one or more default settings (e.g., settings not unique or associated with a particular user 140 or user account 150). A plurality of digital pens 160 may be simultaneously used with a user device 110. Upon determining that no digital pens 160 are positioned within the cavity 220 (e.g., all digital pens 160 are removed from the cavity 220) or that each digital pen 160 positioned within the cavity 220 is charged a predetermined amount (e.g., 100%), in at least some examples, the charge module 240 does not transmit or ceases at 1040 transmission of energy towards the cavity 220.

Figure 11:
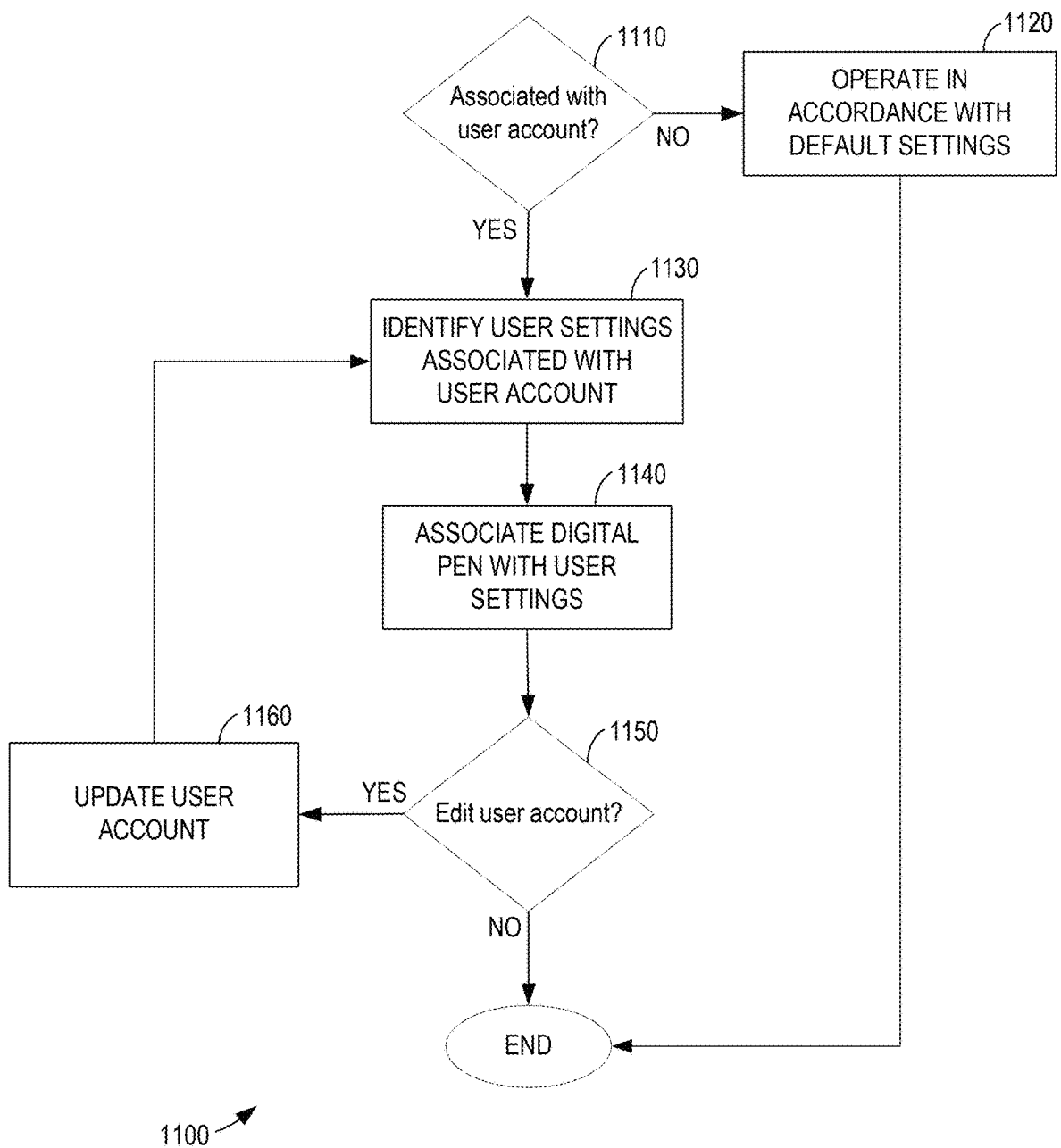
FIG. 11 is a flow chart illustrating an example method of managing an operation of an authentication module using a computing device, such as the computing device shown in FIG. 9.

FIG. 11 is a flow chart illustrating an example method 1100 of managing an authentication module 270. A variety of input may be provided to the digital pen 160 or a user device 110 (e.g., base station 200, 420, 520, 600, 700, 800, palette device 410, 510) to affect an operation of the digital pen 160, the user device 110, or another user device. A username and password may be provided to access the user account 150. For example, it may be determined at 1110 whether the digital pen 160 is associated with a user account 150 by comparing the provided username and password with a predetermined, verified user name and password associated with the user account 150. Digital pens 160 not associated with a user account 150 (e.g., a provided username and password do not match the predetermined, verified username or password) may operate in accordance with one or more default settings at 1120.

Upon determining that the digital pen 160 is associated with the user account 150, one or more user settings associated with the user account 150 are identified at 1130, and the digital pen 160 is associated with the user settings at 1140 such that the digital pen 160 is configured to operate in accordance with the user settings. In at least some examples, a user 140 with access to the user account 150 (e.g., a user 140 of a digital pen 160 associated with the user account 150) may provide input to edit the user account 150 at 1150 to include at least some information associated with the input, and the user account 150 is updated based on the input at 1160. For example, a pen-button assignment may be provided, and one or more user settings may be created or updated based on the provided pen-button assignment. The pen-button assignment may remain associated with the user account 150 until a predetermined event (e.g., the pen-button assignment is disassociated from the user account 150, a new pen-button assignment is associated with the user account 150) occurs or a predetermined amount of time lapses. The user 140 may be authenticated based on input that verifies an identity of the user 140 with a relatively high confidence (e.g., biometric data).

An operating parameter associated with the digital pen 160 may be adjusted. A palette module 280 or a palette device 410, 510 may be present one or more options to the user 140, and the user 140 may select one of the options. For example, the operating parameter may be adjusted such that the digital pen 160 operates in accordance with the selected option. The digital pen 160 may continue to operate in accordance with the selected option until a predetermined event (e.g., the digital pen 160 is positioned within the cavity 220, a new operating parameter conflicting with the selected option is provided) occurs or predetermined amount of time lapses, at which point a digital pen 160 not associated with a user account 150 may operate in accordance with one or more default settings and a digital pen 160 associated with a user account 150 may operate in accordance with one or more user settings.

In this manner, a user 140 may pick up a digital pen 160, customize the digital pen 160 at one user device 110 (e.g., a palette), and/or use the digital pen 160 at another user device 110 (e.g., a whiteboard) in accordance with the customizations. The digital pen 160 may be associated with one or more user settings (e.g., via logging in to user account 150) at any user device 110 and be associated with the user settings across all the user devices 110. That is, the other user devices 110 may automatically recognize the user settings such that the digital pen 160 is configured to interact with each user device 110 in accordance with the user settings with no or little user intervention. The user 140 may interact with one user device 110 via another user device 110. For example, a user 140 may write on a whiteboard by interacting with a palette and/or access a palette by interacting with a whiteboard.

The base station 200 serves as a collaboration tool that may be positioned at the center of a meeting room table. The base station 200 may provide teleconferencing functionality. In at least some examples, local audiovisual content is detected and, based on the input audiovisual content, a first signal is generated for transmission to a remote device (e.g., a user device 110). Additionally or alternatively, a second signal is received from the remote device and, based on the second signal, remote audio visual content is presented.

The base station 200 serves as a connection point for data synchronization across a plurality of users 140 and a plurality of devices (e.g., digital pen 160, base station 200, 420, 520, 600, 700, 800, palette device 410, 510, and/or user device 110). User settings may be synchronized across devices to enable a plurality of users 140 to simultaneously use a plurality of digital pens 160 associated with their respective user accounts 150 on an interactive whiteboard. The digital pen 160 may upload data captured by the digital pen 160 (e.g., location data, gesture data, biometric data) during use to the base station 200 when the digital pen 160 is returned to the cavity 220. A user 140 may be authenticated by a thumbprint, a signature, or any other verification parameter.

The subject matter described herein enables a docking station to provide various capabilities including storing, charging, data connecting, and easily accessing digital pens. In some examples, a digital pen may be efficiently and effectively used across a plurality of user devices including the docking station. In this way, a plurality of peripheral devices may be used by a plurality of users in a seamless manner.

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

The examples illustrated and described herein as well as examples not specifically described herein but within the scope of aspects of the disclosure constitute example means for managing an operation of a peripheral device. For example, the elements illustrated in FIGS. 1-9, such as when encoded to perform the operations illustrated in FIGS. 10 and 11 constitute at least an example means for determining whether a peripheral device is positioned within a cavity, and transmitting energy towards the cavity to charge the peripheral device; and an example means for determining whether a peripheral device is associated with a user account, identifying one or more user settings associated with the user account, and associating the peripheral device with the user settings such that the peripheral device is configured to operate in accordance with the user settings.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

a digital pen;
a user device configured to interact with the digital pen;
a sidewall at least partially defining a cavity, the cavity sized to retain a plurality of digital pens therein;

a charge module including one or more inductive rings coupled to the sidewall such that the inductive rings extend about the cavity;
a charge module configured to determine whether a digital pen is positioned within the cavity;
a charge module configured to use inductive rings to transmit energy towards the cavity such that the charge module charges the digital pen through induction;
one or more inductive rings coupled to the sidewall such that the charge module is configured to charge a first digital pen having a first configuration and a second digital pen having a second configuration different from the first configuration;
an authentication module configured to determine whether the digital pen is associated with a user account;
an authentication module configured to identify one or more user settings associated with the user account;
an authentication module configured to associate the digital pen with the user settings such that the digital pen is configured to operate in accordance with the user settings;
an authentication module configured to receive input from the digital pen;
an authentication module configured to authenticate a user associated with the digital pen;
an authentication module configured to receive input from a palette device;
an authentication module configured to adjust an operating parameter associated with the digital pen;
an authentication module configured to couple a first user device to a second user device;
a palette module including a display screen coupled to an outer surface of the sidewall, the display screen configured to present a display image;
a palette module including one or more sensors positioned about the display screen, the sensors configured to detect a pressure applied to the display screen;
a palette module configured to identify one or more operations associated with the detected pressure;
a palette module including a projector configured to project a display image onto a surface;
a palette module including one or more sensors positioned about the display screen, the sensors configured to detect a location of an object positioned on the surface;
a palette module configured to identify one or more operations associated with the detected location;
a palette module configured to receive input associated with one or more operations;
a palette module configured to perform the operations;
a communication module including one or more microphones coupled to the sidewall, the microphones configured to detect audio input;
a communication module including one or more speakers coupled to the sidewall, the speakers configured to project audio output;
a communication module including one or more cameras coupled to the sidewall, the cameras configured to detect video input;
a communication module including one or more display screens coupled to the sidewall, the display screens configured to present video output;
determining whether the peripheral device is positioned within a cavity at least partially defined by a sidewall;
transmitting energy towards the cavity to charge the peripheral device;
determining whether the peripheral device is associated with a user account;
identifying one or more user settings associated with the user account;
associating the peripheral device with the user settings such that the peripheral device is configured to operate in accordance with the user settings;
determining that each peripheral device positioned within the cavity is fully charged;
ceasing transmission of energy towards the cavity;
receiving input from the peripheral device;
authenticating a user associated with the peripheral device;
editing the user account to include at least some information associated with the input;
adjusting an operating parameter associated with the peripheral device;
presenting, at a display screen, a display image;
detecting pressure applied to the display screen;
identifying one or more operations associated with the detected pressure;
projecting, onto a surface remote from the sidewall, a display image;
detecting a location of an object positioned on the surface;
identifying one or more operations associated with the detected location;
performing the operations;
detecting, at a communication module, local audiovisual content;
generating a first signal for transmission to a remote device;
receiving, from the remote device, a second signal; and
presenting, at the communication module, remote audiovisual content.

In some examples, the operations illustrated in FIGS. 10 and 11 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A base station comprising:
a sidewall at least partially defining a cavity, the cavity sized to retain a peripheral device therein;
a charge module comprising one or more inductive rings coupled to the sidewall such that the inductive rings extend about the cavity, the charge module configured to:
determine whether the peripheral device is positioned within the cavity, and
based at least on determining that the peripheral device is positioned within the cavity, use the inductive rings to transmit energy towards the cavity such that the charge module charges the peripheral device through induction; and
an authentication module configured to:
determine whether the peripheral device is associated with any user accounts, and
based at least on determining the peripheral device is not associated with any user accounts, configure the peripheral device to operate in accordance with default settings that are not unique or associated with a particular user or any user accounts.

2. The base station of claim 1, wherein the one or more peripheral devices comprises a second plurality of inductive rings, wherein a configuration of the second plurality of inductive rings is based on a voltage associated with the one or more peripheral devices.

3. The base station of claim 2, wherein the authentication module is configured to:
receive input from a second one of the one or more peripheral devices; and
based on the input, authenticate a user associated with the second one of the one or more peripheral devices.

4. The base station of claim 3, further comprising a palette module configured to interact with the one or more peripheral devices, the palette module further configured to:
receive input from a palette device; and
based on the input, adjust an operating parameter associated with the one or more peripheral devices.

5. The base station of claim 4, wherein the palette module comprises:
a display screen coupled to an outer surface of the sidewall, the display screen configured to present a display image;
one or more sensors positioned about the display screen, the sensors configured to detect a pressure applied to the display screen, wherein, based on the pressure applied to the display screen, the palette module is configured to:
identify one or more operations associated with the detected pressure; and
perform the operations.

6. The base station of claim 1, wherein the peripheral devices sends a username and a password to an authentication module, the authentication module configured to:
receive the username and the password from the peripheral device; and
determine the peripheral device within the cavity is not associated with any user accounts based at least on the username and password not matching a verified username and a verified password.

7. The base station of claim 6, wherein based at least on determining that the username and the password from the peripheral device are not associated with any user accounts, configure the peripheral device within the cavity to operate in accordance with the default settings.

8. A computer-implemented method for managing an operation of a peripheral device, the method comprising executing on one or more computing devices the operations of:
determining whether the peripheral device is positioned within a cavity;
based at least on determining that the peripheral device is positioned within the cavity, use the inductive rings to transmit energy towards the cavity such that the charge module charges the peripheral device through induction;
determining the peripheral device is not associated with any user accounts, and
based at least on determining the peripheral device is not associated with any user accounts, configuring the peripheral device to operate in accordance with default settings that are not associated with a particular user or any user accounts.

9. The method of claim 8, wherein the one or more peripheral devices comprises a second plurality of inductive rings, wherein a configuration of the second plurality of inductive rings is based on a voltage associated with the one or more peripheral devices.

10. The method of claim 8, further comprising:
receiving input from a second one of the one or more peripheral devices; and
based on the input, authenticating a user associated with the second one of the one or more peripheral devices.

11. The method of claim 8, further comprising:
receiving input from a palette device; and
based on the input, adjusting an operating parameter associated with the one or more peripheral devices.

12. The method of claim 8, further comprising:
receiving input from the peripheral device; and
based on the input, adjusting an operating parameter associated with the peripheral device.

13. The method of claim 8, further comprising:
presenting, at a display screen, a display image;
detecting pressure applied to the display screen;
identifying one or more operations associated with the detected pressure; and
performing the operations.

14. The method of claim 8, wherein based at least on determining that at least one of the username and the password from the peripheral device is not associated with any user accounts, configure the peripheral device within the cavity to operate in accordance with default settings.

15. A system comprising:
a peripheral device;
a first user device configured to interact with the peripheral device; and
a second user device comprising:
a sidewall at least partially defining a cavity, the cavity sized to retain the peripheral device therein,
a charge module comprising one or more inductive rings coupled to the sidewall such that the inductive rings extend about the cavity, the charge module configured to:
determine whether the peripheral device is positioned within the cavity, and
based at least on determining that the peripheral device is positioned within the cavity, use the inductive rings to transmit energy towards the cavity such that the charge module charges the peripheral device through induction; and
an authentication module configured to:
determine the peripheral device is not associated with any user accounts, and
based at least on determining the peripheral device is not associated with any user accounts, configure the peripheral device to operate in accordance with default settings that are not associated with a particular user or any user accounts.

16. The system of claim 15, wherein the authentication module is configured to couple the first user device to the second user device.

17. The system of claim 15, wherein the second user device comprises a palette module configured to receive input associated with one or more operations, and, based on the received input, perform the operations.

18. The system of claim 15, wherein the peripheral device comprises a second plurality of inductive rings, wherein a configuration of the second plurality of inductive rings is based on a voltage associated with the one or more peripheral devices.

19. The system of claim 15, wherein the authentication module is configured to:

receive input from a second one of the one or more peripheral devices; and based on the input, authenticate a user associated with the second one of the one or more peripheral devices.

20. The system of claim 15, further comprising a palette module configured to interact with the one or more peripheral devices, the palette module further configured to:

receive input from a palette device; and based on the input, adjust an operating parameter associated with the one or more peripheral devices.

* * * * *